M. G. HOWE.
Device for Transmitting Rotary Motion.

No. 222,909.    Patented Dec. 23, 1879.

WITNESSES:
Jas. E. Hutchinson.
Wm Beale Hale.

INVENTOR.
Milton G. Howe,
by James L. Norris.
Att'y

UNITED STATES PATENT OFFICE.

MILTON G. HOWE, OF HOUSTON, TEXAS, ASSIGNOR OF ONE-HALF OF HIS RIGHT TO JOHN D. RICHARDSON, OF SAME PLACE.

IMPROVEMENT IN DEVICES FOR TRANSMITTING ROTARY MOTION.

Specification forming part of Letters Patent No. 222,909, dated December 23, 1879; application filed November 11, 1879.

*To all whom it may concern:*

Be it known that I, MILTON G. HOWE, of Houston, in the county of Harris and State of Texas, have invented certain new and useful Improvements in Devices for Transmitting Rotary Motion, of which the following is a specification.

This invention relates to improved devices for transmitting rotary motion from one shaft to another arranged at an angle thereto. Its object is to produce a smooth, positive, and approximately noiseless transmission, and to avoid the use of bevel-gears, worms, and worm-wheels and belting.

It consists in the combination of a wheel mounted on a rotary shaft and provided with a continuous peripheral groove adapted, when the wheel is rotated, to snugly embrace two, or portions of two, or more faces of an angular nut mounted on a shaft and simultaneously rotating in a plane at an angle to the plane of rotation of said grooved wheel in all the successive positions assumed by said nut and wheel, and an angular nut mounted on a rotary shaft and projecting at one side of its axis into the groove in said wheel.

It consists, also, in a novel mode of attaching the nut to its shaft and securing a bearing therefor, which accommodates variation of the shaft from a straight line, and at the same time preserves the proper position of the nut with relation to the grooved wheel, as will be hereinafter more particularly described.

It is obvious from the nature of the groove in the wheel, as above defined, that if the nut is fitted into any corresponding portion of said groove, and the wheel be then rotated, the continual change of contour of the groove which is presented to the nut will cause the nut to assume a position to fit each portion of the groove as presented, and therefore, if the shaft carrying the wheel be continuously rotated, the nut will also be forced to rotate and continually change its position to correspond to the groove, and its rotation will, of course, be communicated to the shaft upon which it is fixed.

Figure 1:
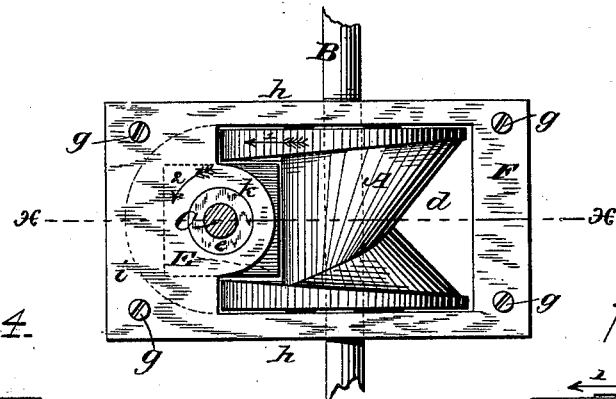
Figure 4:
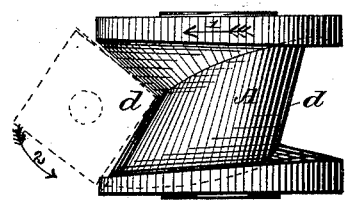
Figure 2:
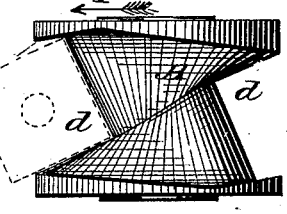
Figure 8:
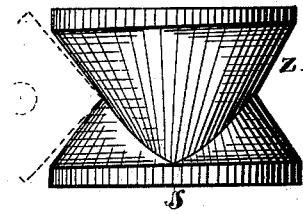
Figure 3:
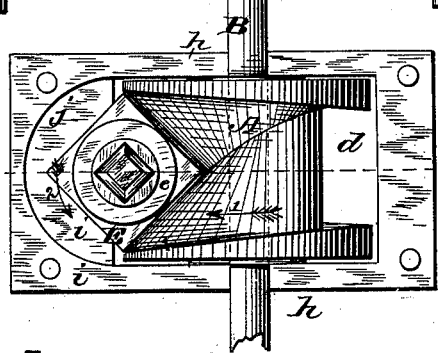
Figure 7:
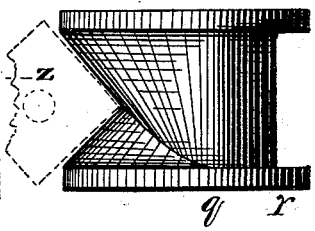
Figures 5, 6:
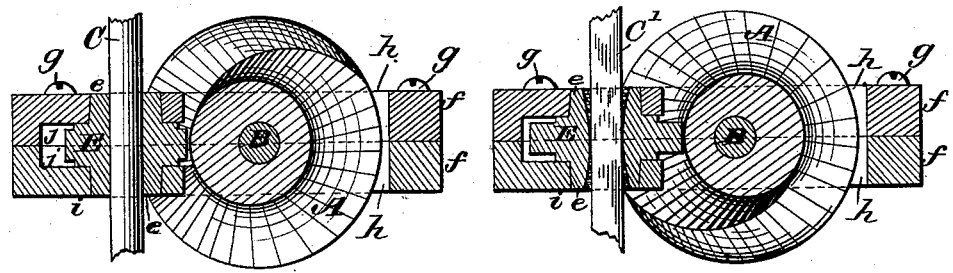

In the accompanying drawings, Figure 1 is a view, in elevation, of my invention, showing the grooved periphery of the wheel in one of its positions and the nut projecting into the groove. Figs. 2 and 4 are detached views, in elevation, of the grooved wheel in different positions. Fig. 3 is an elevation with one-half of the bearing-frame removed. Fig. 5 is a section on line $x$ $x$, Fig. 1. Fig. 6 is a similar section, but showing a modified mode of attaching the nut to the shaft. Figs. 7 and 8 illustrate modified forms of the groove.

The letter A designates the grooved wheel mounted on the shaft B, from which rotary motion is to be transmitted to a shaft, C, arranged at right angles to the same. This wheel A has a peripheral groove, $d$, which varies in shape continually from any given point to another in such manner that when the wheel is rotated said groove will snugly but loosely embrace two, or portions of two, or more faces of the nut E, fixed on shaft C, when said nut rotates simultaneously with the wheel, the nut having a fixed plane of rotation at right angles to that of the wheel.

In Fig. 1 the nut E is represented as partially inserted edgewise into the groove of the wheel, with one of its faces parallel with the axis of said wheel. The inner or bottom wall of the groove at the point opposite the edge of the nut is about parallel with the same, and the side walls of the grooves are about at right angles to the bottom or inner wall. Now, if the wheel A is caused to turn in the direction of the arrow No. 1, the nut, owing to the gradual continuous change of shape of the portion of the groove presented to it, will be forced to turn in the direction of arrow No. 2, and when the wheel has performed about one-eighth of a rotation the parts will have assumed the relative positions shown in Fig. 2. About one-third of a rotation farther of the wheel will bring the wheel and nut to the positions shown in Fig. 3, and a further movement, say one-eighth of a rotation, will place the parts as in Fig. 4. The variation of shape of the groove in the wheel is continuous, and in the present instance it has a portion to correspond to every presentation of the faces of the nut during the making by the latter of one-fourth of a revolution; for as there are four similar faces of the nut during one revolution it will assume any given position with relation to the wheel four times.

Though I have now described the grooved wheel as formed to make four revolutions to one of the square nut, it will be understood that the relative speeds of the wheel and nut may be varied by changing the pitch of the groove in the wheel. This will be more readily understood by imagining the groove of the wheel to be originally formed by rotating the nut in the path of the rotating wheel and causing it to penetrate a proper distance from the periphery toward the center thereof, the wheel being formed of material which can be removed or scraped away by the nut. Of course, the groove thus formed will have a contour corresponding to the continual change of position of the nut, and thus, if the nut is caused to make any given number of revolutions to one of the wheel, a groove is formed which will cause said nut to perform the same number of revolutions, supposing it to be engaged with said groove and the wheel rotated.

From this explanation it will be understood that a groove may be formed in the wheel which will communicate an intermittent rotary movement to the nut, for suppose that in the forming of the groove, as in the imaginary case above, said nut should be caused to cease moving and remain in one position while the wheel moves one-fourth of a revolution, then when the nut is engaged with the finished wheel in rotation it will stand still or be held in the same position by that portion of the wheel which was formed while it was stationary.

Fig. 7 shows the periphery of a wheel grooved to give intermittent motion to the nut, which will, of course, remain stationary while in the uniform part of the groove, as shown, between $q$ and $r$. Fig. 8 shows the groove formed to reverse the movement of the nut at the point $s$.

It will now also be readily understood that the groove may be so formed as to communicate a reciprocating motion to the nut, or a variable motion, alternately fast and slow; or the groove may be so formed as to give to the nut all the movements which have been mentioned.

The letter F designates a frame in which the shafts are mounted. This frame is rectangular, and composed of the two rectangular frame-like parts, $f f$, held flatwise together by screws $g$. The opposite side bars, $h$, of each of these frame-like parts are provided with semicircular recesses, which, when the said parts are placed together, form circular bearings for the shaft B, and the wide end bars, $i$, of the frame-like parts are reversed on one side, as shown at $j$, and provided with ears $k$, in which are formed bearings for the tubular journals $e$ $e$ of the nut E, and when the said frame-like parts $f$ are secured together, the recesses $j$ form a chamber in which moves that part of the nut E which is not in the groove of the wheel. This frame may be arranged and secured by any ordinary means, as either a hanger or standard, and, as is obvious, its construction may be greatly modified, it only being necessary that the wheel and nut shall engage essentially as shown, and that the shafts shall be arranged at angles to each other.

In the modified form of attachment of the nut to its shaft, as shown in Fig. 6, that portion of the shaft C' which passes through the nut is square, in cross-section, but may have any other angular cross-section, and the aperture of the nut has a similar shape, fitting at its center or middle snugly around the shaft and flaring toward both ends, in order to permit vibration of the shaft, and thus secure the effect usually attained by a self-adjusting bearing in accommodating the lateral movement of a shaft varying in any degree from a straight line, and at the same time allowing the nut to maintain its uniform plane of rotation, in order to preserve a proper relation to the grooved wheel.

What I claim is—

1. The combination of a wheel mounted on a rotary shaft, and provided with a continuous peripheral groove adapted, when the wheel is rotated, to snugly embrace two, or portions of two, or more faces of an angular nut mounted on a shaft, and simultaneously rotating in a plane at an angle to the plane of rotation of the said grooved wheel, in all the successive positions assumed by said nut and wheel, and an angular nut mounted on a rotary shaft, and projecting at one side of its axis into the groove of said wheel, substantially as described, and for the purpose set forth.

2. The combination, with the rotary nut, having tubular journals and a central aperture flaring toward both ends, of a shaft passing through said aperture, and adapted to rotate with said nut, substantially as described.

In testimony that I claim the foregoing I have hereunto set my hand in the presence of the subscribing witnesses.

MILTON G. HOWE.

Witnesses:
   J. A. McMILLAN,
   J. D. RICHARDSON.